(12) United States Patent
Kamiya et al.

(10) Patent No.: US 10,471,944 B2
(45) Date of Patent: Nov. 12, 2019

(54) VEHICLE BRAKE DEVICE

(71) Applicants: Advics Co., Ltd., Kariya-shi, Aichi-ken (JP); Toyota Jidosha Kabushiki Kaisha, Toyota-shi, Aichi-ken (JP)

(72) Inventors: Yusuke Kamiya, Okazaki (JP); Takahiro Okano, Chiryu (JP)

(73) Assignees: ADVICS CO., LTD., Kariya-Shi, Aichi-Ken (JP); TOYOTA-JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 3 days.

(21) Appl. No.: 15/743,515

(22) PCT Filed: Jul. 20, 2016

(86) PCT No.: PCT/JP2016/071327
§ 371 (c)(1),
(2) Date: Jan. 10, 2018

(87) PCT Pub. No.: WO2017/018302
PCT Pub. Date: Feb. 2, 2017

(65) Prior Publication Data
US 2018/0201245 A1    Jul. 19, 2018

(30) Foreign Application Priority Data
Jul. 29, 2015   (JP) ................. 2015-149928

(51) Int. Cl.
*B60T 8/40*  (2006.01)
*B60T 8/17*  (2006.01)
(Continued)

(52) U.S. Cl.
CPC ............ *B60T 8/4068* (2013.01); *B60T 7/042* (2013.01); *B60T 8/00* (2013.01); *B60T 8/17* (2013.01);
(Continued)

(58) Field of Classification Search
CPC ........ B60T 8/40; B60T 8/4013; B60T 8/4068; B60T 8/4072; B60T 8/4081;
(Continued)

(56) References Cited

U.S. PATENT DOCUMENTS 5,044,700 A * 9/1991 Willmann ............... B60T 8/441
188/358
9,315,184 B2 * 4/2016 Shimizu ................... B60T 7/042
(Continued)

FOREIGN PATENT DOCUMENTS

JP    11-105687 A    4/1999
JP    3320768 B2 *  9/2002
(Continued)

OTHER PUBLICATIONS

International Search Report (PCT/ISA/210) dated Aug. 19, 2016, by the Japanese Patent Office as the International Searching Authority for International Application No. PCT/JP2016/071327.
(Continued)

*Primary Examiner* — Thomas J Williams
(74) *Attorney, Agent, or Firm* — Buchanan Ingersoll & Rooney PC

(57) ABSTRACT

A vehicle brake device provided with a hydraulic pressure generating portion, an actuator and a controlling portion which maintains a driving force of the driving portion when a control subject pressure in a control subject chamber is within a dead zone, wherein the control subject pressure varies in response to a variation of the master pressure and a pulsation is generated in the master pressure accompanying an operation of the actuator. The vehicle brake device further includes a rigidity information obtaining portion which obtains a rigidity information and a dead zone setting portion which sets the dead zone based on the rigidity information obtained by the rigidity information obtaining
(Continued)

portion such that the higher the rigidity of the control subject chamber, or the higher the probability of rigidity increase of the control subject chamber, the wider the dead zone is set.

6 Claims, 6 Drawing Sheets

(51) Int. Cl.
- *B60T 13/14* (2006.01)
- *B60T 13/66* (2006.01)
- *B60T 8/46* (2006.01)
- *B60T 8/172* (2006.01)
- *B60T 8/171* (2006.01)
- *B60T 8/1761* (2006.01)
- *B60T 8/1763* (2006.01)
- *B60T 7/04* (2006.01)
- *B60T 8/00* (2006.01)
- *B60T 13/68* (2006.01)

(52) U.S. Cl.
CPC .............. *B60T 8/171* (2013.01); *B60T 8/172* (2013.01); *B60T 8/17616* (2013.01); *B60T 8/17636* (2013.01); *B60T 8/40* (2013.01); *B60T 8/4077* (2013.01); *B60T 8/46* (2013.01); *B60T 13/146* (2013.01); *B60T 13/662* (2013.01); *B60T 13/686* (2013.01); *B60T 2210/12* (2013.01)

(58) Field of Classification Search
CPC .......... B60T 8/4077; B60T 8/17; B60T 8/171; B60T 8/172; B60T 7/042; B60T 13/10; B60T 13/142; B60T 13/145; B60T 13/146; B60T 13/662; B60T 13/668
See application file for complete search history.

(56) References Cited

U.S. PATENT DOCUMENTS

| | | | | |
|---|---|---|---|---|
| 2002/0027388 A1* | 3/2002 | Tanaka | .................... | B60T 8/172 303/150 |
| 2014/0008967 A1* | 1/2014 | Takeuchi | .............. | B60T 13/161 303/155 |
| 2015/0015059 A1* | 1/2015 | Kamiya | .................. | B60T 7/042 303/6.01 |
| 2015/0151730 A1 | 6/2015 | Shimizu et al. | | |
| 2015/0360656 A1 | 12/2015 | Masuda | | |
| 2016/0339889 A1* | 11/2016 | Okano | .................... | B60T 7/042 |
| 2016/0347297 A1* | 12/2016 | Ninoyu | .............. | B60T 8/17616 |
| 2016/0355168 A1* | 12/2016 | Ninoyu | ................. | B60T 8/4077 |

FOREIGN PATENT DOCUMENTS

| | | | |
|---|---|---|---|
| JP | 3320768 B2 | | 9/2002 |
| JP | 4432743 B2 | * | 3/2010 |
| JP | 4432743 B2 | | 3/2010 |
| JP | 4993105 B2 | | 8/2012 |
| JP | 5040013 B2 | | 10/2012 |
| JP | 2014-19172 A | | 2/2014 |
| JP | 2014-133429 A | | 7/2014 |

OTHER PUBLICATIONS

Written Opinion (PCT/ISA/237) dated Aug. 19, 2016, by the Japanese Patent Office as the International Searching Authority for International Application No. PCT/JP2016/071327.

* cited by examiner

VEHICLE BRAKE DEVICE

TECHNICAL FIELD

This invention relates to a vehicle brake device.

BACKGROUND ART

In a vehicle brake device, an actuator is disposed between the master cylinder and the wheel cylinders for outputting a master pressure which is a hydraulic pressure in the master chamber by adjusting the master pressure to the wheel cylinder. For example, pressures in the four wheel cylinders are independently adjusted by the actuator. Thus, each wheel pressure (pressure in the wheel cylinder) is appropriately controlled, as is controlled by an ABS (anti-lock brake system), depending on the situation. Further, a driving portion is provided in the vehicle brake device for controlling the master pressure by driving a master piston. A vehicle brake device which includes the driving portion and the actuator (ABS) is disclosed for example, in Japanese Patent Literature JP 2014-19172.

CITATION LIST

Patent Literature

[Patent Literature 1] P2014-19172A

SUMMARY OF INVENTION

Technical Problem(s)

According to the vehicle brake device which is equipped with an actuator, fluid amount at the master cylinder side varies due to a driving of an actuator, and accordingly, the master pressure tends to pulsate (vibrate). Then, the driving portion reacts against such pulsation of the master pressure to adjust the pressure to a target pressure level. In other words, the shorter the pulsation period of the master pressure, the larger the number of operations of the driving portion becomes, when the driving portion operates in response to the master pressure pulsation. Accordingly, the driving portion may fall in an excessive operation state due to the short period pressure pulsation. Therefore, above explained vehicle brake device still has a room for improvement in durability of various components.

Accordingly, this invention was made in consideration with the above-mentioned situation and the objective of the invention is to provide a vehicle brake device which can effectively suppress an excessive operation of the driving portion.

Solution to Problem(s)

The vehicle brake device according to the invention is characterized in that the vehicle brake device includes a hydraulic pressure generating portion having a driving portion which drives a master piston, an actuator disposed between the hydraulic pressure generating portion and a wheel cylinder for outputting a master pressure which is a hydraulic pressure in a master chamber to the wheel cylinder by adjusting the master pressure and a controlling portion which maintains a driving force of the driving portion when a control subject pressure which is a hydraulic pressure in a control subject chamber is within a dead zone set based on a target value of the control subject pressure wherein the control subject pressure varies in response to a variation of the master pressure and a pulsation is generated in the master pressure accompanying the operation of the actuator. The vehicle brake device further includes a rigidity information obtaining portion which obtains a rigidity information which relates to a rigidity of the control subject chamber and a dead zone setting portion which sets the dead zone based on the rigidity information obtained by the rigidity information obtaining portion, wherein the higher the rigidity of the control subject chamber, or the higher the probability of rigidity increase of the control subject chamber, the wider the dead zone is set by the dead zone setting portion.

Effect of Invention

The higher the rigidity of the control subject chamber, the easier the master pressure receives an influence of pressure adjusting of the actuator and the easier the master pressure pulsates. However, according to the invention, the dead zone can be set wide depending on the magnitude of the rigidity of the control subject chamber, based on the rigidity information. Therefore, in a situation where the master pressure is easily pulsated, the maintaining control of the driving force of the driving portion can be easily executed, thereby to suppress an occurrence of the number of operations of the driving portion, to eventually suppress an excess operation of the driving portion.

BRIEF EXPLANATION OF ATTACHED DRAWINGS

EMBODIMENTS FOR IMPLEMENTING INVENTION

Figure 1:
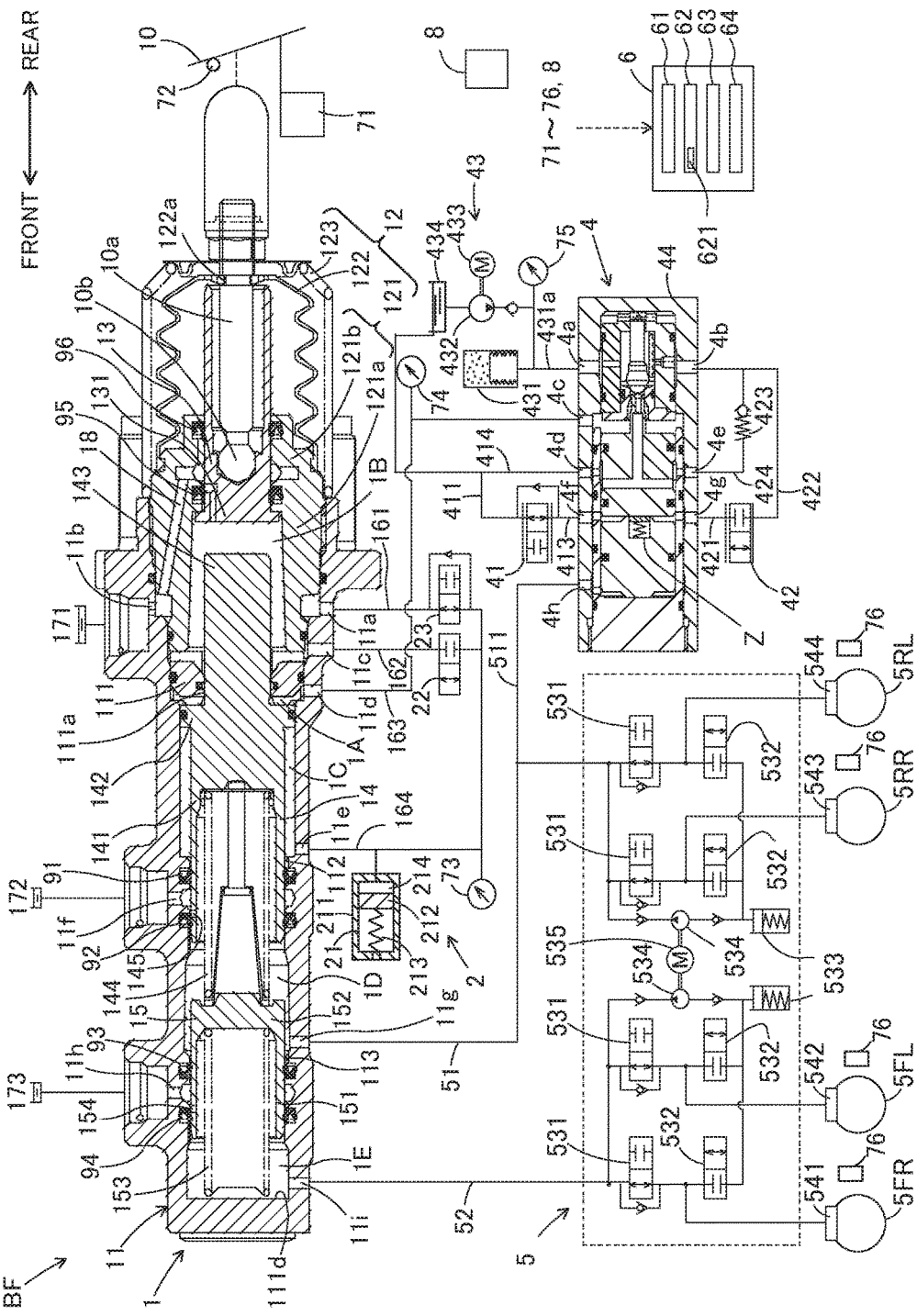
FIG. 1 is a structural view of the vehicle brake device according to an embodiment of the invention.

The embodiments of the invention will be explained hereinafter with reference to the attached drawings. It is noted that each drawing used for explanation shows a conceptual drawing and the shape of each portion in the drawings does not necessarily indicate an accurate shape in practical use. As shown in FIG. 1, the vehicle brake device according to a first embodiment of the invention is formed by a hydraulic pressure braking force generating device BF which generates a hydraulic pressure braking force at vehicle wheels 5FR, 5FL, 5RR and 5RL and a brake ECU 6 which controls the hydraulic pressure braking force generating device BF.

(Hydraulic Pressure Braking Force Generating Device BF)

The hydraulic pressure braking force generating device BF includes as shown in FIG. 1, a master cylinder 1, a reaction force generating device 2, a first control valve 22, a second control valve 23, a servo pressure generating device (corresponding to "a driving portion") 4, an actuator 5, wheel cylinders 541 through 544 and various sensors 71 through 76. The master cylinder 1 and the servo pressure generating device 4 correspond to the "hydraulic pressure generating portion".

(Master Cylinder 1)

The master cylinder 1 is a portion which supplies the actuator 5 with an operating fluid in response to the operating amount of a brake pedal 10 and is formed by a main cylinder 11, a cover cylinder 12, an input piston 13, a first master piston 14 and a second master piston 15 and so on. The brake pedal 10 may be of any type of brake operating means that can perform brake operation by a driver of the vehicle.

The main cylinder 11 is formed in a substantially bottomed cylinder shape housing having a bottom surface closed at a front end and an opening at a rear end thereof. The main cylinder 11 includes therein an inner wall portion 111, which extends inwardly with a shape of flange at a rear side in the inner peripheral side of the main cylinder 11. An inner circumferential surface of the inner wall portion 111 is provided with a through hole 111a at a central portion thereof, penetrating through the inner wall portion in front and rearward direction. The main cylinder 11 is provided therein at portions closer to the front end than the inner wall portion 111 with a small diameter portion 112 (rearward) and a small diameter portion 113 (frontward), each of which inner diameter is set to be slightly smaller than the inner diameter of the inner wall portion 111. In other words, the small diameter portions 112, 113 project from the inner circumferential surface of the main cylinder 11 having an inwardly annularly shaped profile. The first master piston 14 is disposed inside the main cylinder 11 and is slidably movable along the small diameter portion 112 in the axial direction. Similarly, the second master piston 15 is disposed inside the main cylinder 11 and is slidably movable along the small diameter portion 113 in the axial direction.

The cover cylinder 12 includes an approximately cylindrical portion 121, a tubular bellow boots 122 and a cup-shaped compression spring 123. The cylindrical portion 121 is arranged at a rear end side of the main cylinder 11 and is coaxially fitted into the rear side opening of the main cylinder 11. An inner diameter of a front portion 121a of the cylindrical portion 121 is formed to be greater than an inner diameter of the through hole 111a of the inner wall portion 111. Further, the inner diameter of the rear portion 121b is formed to be smaller than the inner diameter of the front portion 121a.

The dust prevention purpose boots 122 is in a tubular bellow shape and is extendible or compressible in front and rearward directions. The front side of the boots 122 is assembled to be in contact with the rear end side opening of the cylindrical portion 121. A through hole 122a is formed at a central portion of the rear of the boots 122. The compression spring 123 is a coil shaped biasing member arranged around the boots 122. The front side of the compression spring 123 is in contact with the rear end of the main cylinder 11 and the rear side of the compression spring 123 is disposed with a preload adjacent to the through hole 122a of the boots 122. The rear end of the boots 122 and the rear end of the compression spring 123 are connected to an operating rod 10a. The compression spring 123 biases the operating rod 10a in a rearward direction.

The input piston 13 is a piston configured to slidably move inside the cover cylinder 12 in response to an operation of the brake pedal 10. The input piston 13 is formed in a substantially bottomed cylinder shape having a bottom surface at a front portion thereof and an opening at a rear portion thereof. A bottom wall 131 forming the bottom surface of the input piston 13 has a greater diameter than the diameters of the other parts of the input piston 13. The input piston 13 is arranged at the rear end portion 121b of the cylindrical portion 121 and is slidably and fluid-tightly movable in an axial direction and the bottom wall 131 is assembled into an inner peripheral side of the front portion 121a of the cylindrical portion 121.

The operating rod 10a operable in association with the brake pedal 10 is arranged inside of the input piston 13. A pivot 10b is provided at a tip end of the operating rod 10a so that the pivot 10b can push the input piston 13 toward front side. The rear end of the operating rod 10a projects towards outside through the rear side opening of the input piston 13 and the through hole 122a of the boots 122, and is connected to the brake pedal 10. The operating rod 10a moves in response to the depression operation of the brake pedal 10. More specifically, when the brake pedal 10 is depressed, the operating rod 10a advances in a forward direction, while compressing the boots 122 and the compression spring 123 in the axial direction. The input piston 13 also advances in response to the forward movement of the operating rod 10a.

The first master piston 14 is arranged in the inner wall portion 111 of the main cylinder 11 and is slidably movable in the axial direction. The first master piston 14 includes a pressurizing cylindrical portion 141, a flange portion 142 and a projection portion 143 in order from the front and the pressurizing cylindrical portion 141, the flange portion 142 and the projection portion 143 are formed integrally as a unit. The pressurizing cylindrical portion 141 is formed in a substantially bottomed cylinder shape having an opening at a front portion thereof and a bottom wall at a rear portion thereof. The pressurizing cylindrical portion 141 includes a clearance formed with the inner peripheral surface of the main cylinder 11 and is slidably in contact with the small diameter portion 112. A coil spring-shaped biasing member 144 is provided in the inner space of the pressurizing cylindrical portion 141 between the bottom of the pressurizing cylindrical portion 141 and the second master piston 15. The first master piston 14 is biased in a rear direction by the biasing member 144. In other words, the first master piston 14 is biased by the biasing member 144 towards a predetermined initial position.

The flange portion 142 is formed to have a greater diameter than the diameter of the pressurizing cylindrical portion 141 and is slidably in contact with the inner peripheral surface of the main cylinder 11. The projection portion 143 is formed to have a smaller diameter than the diameter of the flange portion 142 and is slidably in fluid-tightly contact with the through hole 111a of the inner wall portion 111. The rear end of the projection portion 143 projects into an inner space of the cylindrical portion 121, passing through the through hole 111a and is separated from the inner peripheral surface of the cylindrical portion 121. The rear end surface of the projection portion 143 is separated from the bottom wall 131 of the input piston 13 and the separation distance is formed to be variable.

It is noted here that a "first master chamber 1D" is defined by the inner peripheral surface of the main cylinder 11, a front side of the pressurizing cylindrical portion 141 of the first master piston 14 and a rear side of the second master piston 15. A rear chamber which is located further rearward of the first master chamber 1D, is defined by the inner peripheral surface (inner peripheral portion) of the main cylinder 11, a front surface of the small diameter portion 112, a front surface of the inner wall portion 111 and the outer peripheral surface of the first master piston 14. The front-end portion and the rear end portion of the flange portion 142 of the first master piston 14 separate the rear chamber into a front portion and a rear portion and a "second hydraulic pressure chamber 1C" is defined at the front side of the rear chamber and a "servo chamber (corresponding to the output chamber) 1A" is defined at the rear side of the rear chamber. The volume of the second hydraulic pressure chamber 1C decreases with advancement of the first master piston 14 and increases with the retreat of the first master piston 14. Further, a "first hydraulic pressure chamber 1B" is defined by the inner peripheral surface of the main cylinder 11, a rear surface of the inner wall portion 111, an inner peripheral surface (inner peripheral portion) of the front portion 121a of the cylindrical portion 121, the projection portion 143 (rear end portion) of the first master piston 14 and the front end of the input piston 12.

The second master piston 15 is coaxially arranged within the main cylinder 11 at a location forward of the first master piston 14 and is slidably movable in an axial direction to be in slidable contact with the small diameter portion 113. The second master piston 15 is formed as a unit with a tubular pressurizing cylindrical portion 151 in a substantially bottomed cylinder shape having an opening at a front portion thereof and a bottom wall 152 which closes the rear end of the tubular pressurizing cylindrical portion 151. The bottom wall 152 supports the biasing member 144 with the first master piston 14. A coil spring-shaped biasing member 153 is disposed in the inner space of the pressurizing cylindrical portion 151 between the second piston 15 and a closed inner bottom surface 111d of the main cylinder 11. The second master piston 15 is biased by the biasing member 153 in a rearward direction. In other words, the second master piston 15 is biased by the biasing member 153 towards a predetermined initial position. A "second master chamber 1E" is defined by the inner peripheral surface of the main cylinder 11, the inner bottom surface 111d and the second master piston 15.

Ports 11a through 11i, which connect the inside and the outside of the master cylinder 1, are formed at the master cylinder 1. The port 11a is formed on the main cylinder 11 at a location rearward of the inner wall portion 111. The port 11b is formed on the main cylinder 11 opposite to the port 11a in the axial direction at approximately the same location. The port 11a and the port 11b are in communication through an annular space formed between the inner circumferential surface of the main cylinder 11 and the outer circumferential surface of the cylindrical portion 121. The port 11a and the port 11b are connected to a conduit 161 and also connected to a reservoir 171 (low pressure source).

The port 11b is in communication with the first hydraulic pressure chamber 1B via a passage 18 formed at the cylindrical portion 121 and the input piston 13. The fluid communication through the passage 18 is interrupted when the input piston 13 advances forward. In other words, when the input piston 13 advances forward, the fluid communication between the first hydraulic pressure chamber 1B and the reservoir 171 is interrupted.

The port 11c is formed at a location rearward of the inner wall portion 111 and forward of the port 11a and the port 11c connects the first hydraulic pressure chamber 1B with a conduit 162. The port 11d is formed at a location forward of the port 11c and connects the servo chamber 1A with a conduit 163. The port 11e is formed at a location forward of the port 11d and connects the second hydraulic pressure chamber 10 with a conduit 164.

The port 11f is formed between the sealing members 91 and 92 provided at the small diameter portion 112 and connects a reservoir 172 with the inside of the main cylinder 11. The port 11f is in communication with the first master chamber 1D via a passage 145 formed at the first master piston 14. The passage 145 is formed at a location where the port 11f and the first master chamber 1D are disconnected from each other when the first master piston 14 advances forward. The port 11g is formed at a location forward of the port 11f and connects the first master chamber 1D with a conduit 51.

The port 11h is formed between the sealing members 93 and 94 provided at the small diameter portion 113 and connects a reservoir 173 with the inside of the main cylinder 11. The port 11h is in communication with the second master chamber 1E via a passage 154 formed at the pressurizing cylindrical portion 151 of the second master piston 15. The passage 154 is formed at a location where the port 11h and the second master chamber 1E are disconnected from each other when the second master piston 15 advances forward. The port 11i is formed at a location forward of the port 11h and connects the second master chamber 1E with a conduit 52.

Sealing members, such as O-rings and the like are appropriately provided within the master cylinder 1. The sealing members 91 and 92 are provided at the small diameter portion 112 and are liquid-tightly in contact with the outer circumferential surface of the first master piston 14. Similarly, the sealing members 93 and 94 are provided at the small diameter portion 113 and are liquid-tightly in contact with the outer circumferential surface of the second master piston 15. Additionally, sealing members 95 and 96 are provided between the input piston 13 and the cylindrical portion 121.

The stroke sensor 71 is a sensor which detects the operating amount (stroke) of the brake pedal 10 operated by a driver of the vehicle and transmits the detected result to the brake ECU 6. The brake stop switch 72 is a switch which detects whether the brake pedal 10 is depressed or not, using a binary signal and the detected signal is sent to the brake ECU 6.

(Reaction Force Generating Device 2)

The reaction force generating device 2 is a device which generates a reaction force against the operation force generated when the brake pedal 10 is depressed. The reaction force generating device 2 is formed mainly by a stroke simulator 21. The stroke simulator 21 generates a reaction force hydraulic pressure in the first hydraulic pressure chamber 1B and the second hydraulic pressure chamber 1C in response to the operation of the brake pedal 10. The stroke simulator 21 is configured in such a manner that a piston 212 is fitted into a cylinder 211 while being allowed to slidably move therein. The piston 212 is biased in the rear side direction by a compression spring 213 and a reaction force hydraulic pressure chamber 214 is formed at a location rear side surface of the piston 212. The reaction force hydraulic pressure chamber 214 is connected to the second hydraulic pressure chamber 1C via a conduit 164 and the port 11e, and is connected further to the first control valve 22 and the second control valve 23 via the conduit 164.

(First Control Valve 22)

The first control valve 22 is an electromagnetic valve which is structured to close under non-energized state and opening and closing operations thereof are controlled by the brake ECU 6. The first control valve 22 is disposed between the conduit 164 and the conduit 162 for communication therebetween. The conduit 164 is connected to the second hydraulic pressure chamber 1C via the port 11e and the conduit 162 is connected to the first hydraulic pressure chamber 1B via the port 11c, The first hydraulic pressure chamber 1B becomes in open state when the first control valve 22 opens and becomes in closed state when the first control valve 22 closes. Accordingly, the conduits 164 and 162 are formed for establishing fluid communication between the first hydraulic pressure chamber 1B and the second hydraulic pressure chamber 1C.

The first control valve 22 is closed under non-energized state where an electricity is not applied and under this state, communication between the first hydraulic pressure chamber 1B and the second hydraulic pressure chamber 10 is interrupted. Due to the closure of the first hydraulic pressure chamber 1B, the operating fluid is nowhere to flow and the input piston 13 and the first master piston 14 are moved integrally keeping a constant separation distance therebetween. The first control valve 22 is open under the energized state where an electricity is applied and under such state, the communication between the first hydraulic pressure chamber 1B and the second hydraulic pressure chamber 10 is established. Thus, the volume changes in the first hydraulic pressure chamber 1B and the second hydraulic pressure chamber 1C due to the advancement and retreatment of the first master piston 14 can be absorbed by the transferring of the operating fluid.

The pressure sensor 73 is a sensor which detects the reaction force hydraulic pressure of the second hydraulic pressure chamber 10 and the first hydraulic pressure chamber 1B and is connected to the conduit 164. The pressure sensor 73 detects the pressure of the second hydraulic pressure chamber 1C while the first control valve 22 is in a closed state and also detects the pressure of the first hydraulic pressure chamber 1B while the first control valve 22 is in an open state. The pressure sensor 73 sends the detected signal to the brake ECU 6.

(Second Control Valve 23)

The second control valve 23 is an electromagnetic valve which is structured to open under a non-energized state and the opening and closing operations thereof are controlled by the brake ECU 6. The second control valve 23 is disposed between the conduit 164 and the conduit 161 for establishing fluid communication therebetween. The conduit 164 is in communication with the second hydraulic pressure chamber 10 via the port 11e and the conduit 161 is in communication with the reservoir 171 via the port 11a. Accordingly, the second control valve 23 establishes the communication between the second hydraulic pressure chamber 1C and the reservoir 171 under the non-energized state thereby generating no reaction force hydraulic pressure but the second control valve 23 interrupts the communication therebetween under the energized state thereby generating the reaction force hydraulic pressure.

(Servo Pressure Generating Device 4)

The servo pressure generating device 4 is formed by a pressure decreasing valve 41, a pressure increasing valve 42, a pressure supplying portion 43 and a regulator 44 and so on. The pressure decreasing valve 41 is a valve structured to open under a non-energized state (normally open valve) and the flow-rate (or, pressure) thereof is controlled by the brake ECU 6. One end of the pressure decreasing valve 41 is connected to the conduit 161 via the conduit 411 and the other end thereof is connected to the conduit 413. In other words, the one end of the pressure decreasing valve 41 is connected to the reservoir 171 via the conduits 411 and 161 and ports 11a and 11b. The pressure decreasing valve 41 prevents the operating fluid from flowing out of the later described first pilot chamber 4D by closing. It is noted here that reservoir 171 and the reservoir 434 are in fluid communication, although such fluid communication is not shown in the drawing. Further, a reservoir common to both reservoirs 171 and 434 may be used.

The pressure increasing valve 42 is an electromagnetic valve structured to close under a non-energized state (normally closed valve) and the flow-rate (or pressure) thereof is controlled by the brake ECU 6. One end of the pressure increasing valve 42 is connected to the conduit 421 and the other end thereof is connected to the conduit 422.

Figure 2:
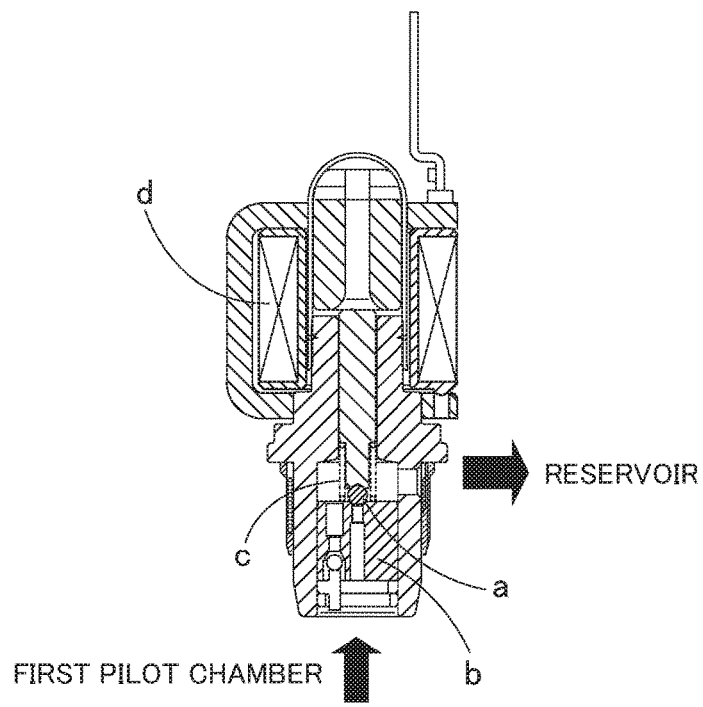
FIG. 2 is a conceptual view for explaining an example of an electromagnetic valve.

One example of a normally open type electromagnetic valve which is used for the pressure decreasing valve 41 will be schematically explained hereinafter. As shown in FIG. 2, the electromagnetic valve (pressure decreasing valve 41) is formed by a valve member "a", a valve seat "b", a spring "c" which biases the valve member "a" in a valve opening direction (in a direction where the valve member "a" is separated from the valve seat "b"), and a coil (solenoid) "d" which generates an electromagnetic driving force for pushing the valve member "a" in a valve closing direction when energized. When a current flowing through the coil "d" is less than a valve closing current, the valve member "a" and the valve seat "b" are separated from each other by the biasing force of the spring "c" and the electromagnetic valve is in a valve open state. However, when a current flowing through the coil "d" is equal to or more than the valve closing current, the valve member "a" is brought into contact with the valve seat "b" by the electromagnetic driving force, which is generated at the coil "d" to push the valve member "a" in the valve closing direction. The electromagnetic driving force becomes larger than the sum of the biasing force of the spring "c" and a pressure differential operation force generated by the pressure difference between an inlet side and an outlet side of the electromagnetic valve when the current flowing through the coil "d" is equal to or more than the valve closing current and the electromagnetic valve is closed. The value of the valve closing current (minimum control current which can close the valve) is decided by the pressure difference between the inlet side and the outlet side of the electromagnetic valve.

As explained, the opening and closing operations of the pressure decreasing valve 41 and the pressure increasing valve 42 are decided by a force balance among the electromagnetic driving force which is generated by the current flowing through the coil "d", the biasing force of the spring "c" and the pressure differential operation force generated by the pressure difference between the inlet side and the outlet side of the electromagnetic valve and are controlled by the current (control current) supplied to the coil "d". It is noted here that the direction of biasing force of the spring and the direction of the electromagnetic driving force are decided according to the structure of the electromagnetic valve (normally open type or normally closed type and so on).

The pressure supplying portion 43 is a portion for supplying the regulator 44 mainly with a highly pressurized operating fluid. The pressure supplying portion 43 includes an accumulator 431 (corresponding to the high-pressure source), a hydraulic pressure pump 432, a motor 433 and the reservoir 434 and so on.

The accumulator 431 is a tank in which a highly pressurized operating fluid is accumulated and is connected to the regulator 44 and the hydraulic pressure pump 432 via a conduit 431a. The hydraulic pressure pump 432 is driven by the motor 433 and supplies the operating fluid which has been reserved in the reservoir 434 to the accumulator 431. The pressure sensor 75 provided in the conduit 431a detects the accumulator hydraulic pressure in the accumulator 431 and sends the detected signal to the brake ECU 6. The accumulator hydraulic pressure correlates with the accumulated operating fluid amount accumulated in the accumulator 431.

When the pressure sensor 75 detects that the accumulator hydraulic pressure drops to a value equal to or lower than a predetermined value, the motor 433 is driven on the basis of a control signal from the brake ECU 6, and the hydraulic pressure pump 432 pumps the operating fluid to the accumulator 431 in order to recover a pressure up to the value equal to or more than the predetermined value.

Figure 3:
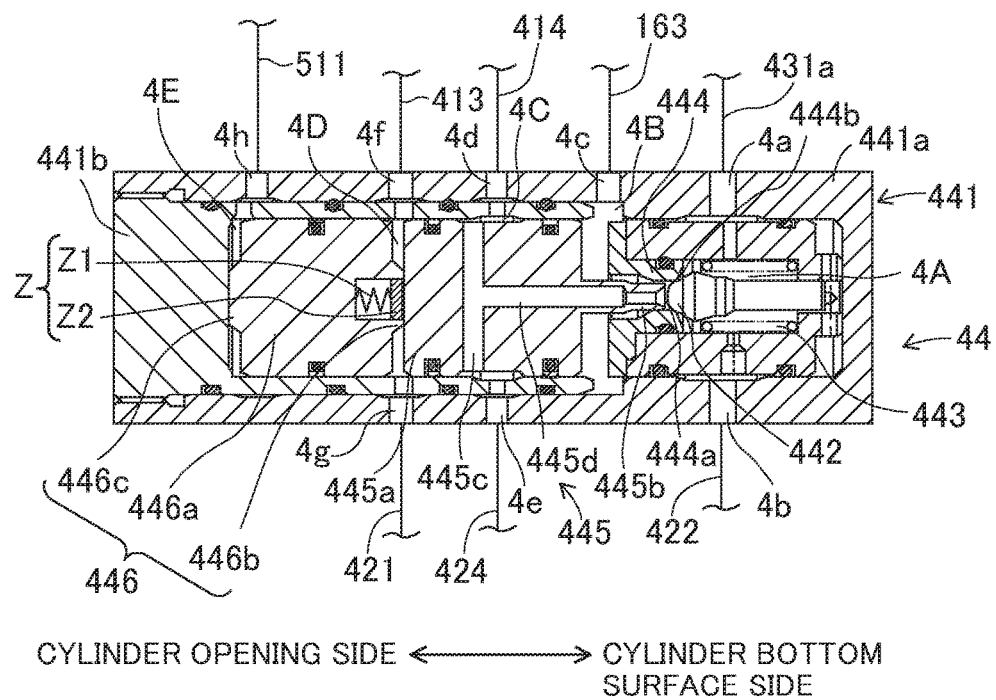
FIG. 3 is a cross sectional view of a regulator according to the embodiment.

The regulator 44 includes a cylinder 441, a ball valve 442, a biasing portion 443, a valve seat portion 444, a control piston 445 and a sub-piston 446 and so forth as shown in FIG. 3. The cylinder 441 includes a cylinder case 441a formed in a substantially bottomed cylinder-shape having a bottom surface at one end thereof (at the right side in FIG. 3) and a cover member 441b closing an opening of the cylinder case 441a (at the left side thereof in FIG. 3). It is noted here that the cylinder case 441a is provided with a plurality of ports 4a through 4h through which the inside and the outside of the cylinder case 441a are in communication. The cover member 441b is formed in a substantially bottomed cylinder-shape having a bottom surface and is provided with a plurality of ports which is arranged at positions facing to the respective cylindrical ports 4d through 4h provided on the cylinder 441.

The port 4a is connected to the conduit 431a. The port 4b is connected to the conduit 422. The port 4c is connected to a conduit 163. The conduit 163 connects the servo chamber 1A and the port 4c. The port 4d is connected to a reservoir 434 via the conduit 414. The port 4e is connected to the conduit 424 and further connected to the conduit 422 via a relief valve 423. The port 4f is connected to the conduit 413. The port 4g is connected to the conduit 421. The port 4h is connected to a conduit 511, which is branched from the conduit 51. It is noted here that the conduit 414 may be connected to the conduit 161.

The ball valve 442 is a valve having a ball shape and is arranged at the bottom surface side (which will be hereinafter referred to also as a cylinder bottom surface side) of the cylinder case 441a inside the cylinder 441. The biasing portion 443 is formed by a spring member biasing the ball valve 442 towards the opening side (which will be hereinafter referred to also as a cylinder opening side) of the cylinder case 441a, and is provided at the bottom surface of the cylinder case 441a. The valve seat portion 444 is a wall member provided at the inner peripheral surface of the cylinder case 441a and divides the cylinder inside into two parts, the cylinder opening side and the cylinder bottom surface side. A through passage 444a, through which the cylinder opening side and the cylinder bottom surface side spaces are in communication, is formed at a central portion of the valve seat portion 444. The valve member 444 holds the ball valve 442 from the cylinder opening side in a manner that the biased ball valve 442 closes the through passage 444a. A valve seat surface 444b is formed at the opening of the cylinder bottom surface side of the through passage 444a and the ball valve 442 is detachably seated on (in contact with) the valve seat surface 444b.

A space defined by the ball valve 442, the biasing portion 443, the valve seat portion 444 and the inner circumferential surface of the cylinder case 441a at the cylinder bottom surface side is referred to as a "first chamber 4A". The first chamber 4A is filled with the operating fluid and is connected to the conduit 431a via the port 4a and to the conduit 422 via the port 4b.

The control piston 445 includes a main body portion 445a formed in a substantially columnar shape and a projection portion 445b formed in a substantially columnar shape having a diameter smaller than the diameter of the main body portion 445a. The main body portion 445a is arranged in the cylinder 441 in a coaxial and liquid-tight manner on the cylinder opening side of the valve seat portion 444, the main body portion 445a being slidably movable in an axial direction. The main body portion 445a is biased towards the cylinder opening side by means of a biasing member (not shown). A passage 445c is formed at a substantially intermediate portion of the main body portion 445a in a cylinder axis direction. The passage 445c extends in the radial direction (in an up-and-down direction as viewed in the drawing) and both ends of the passage 445c are open to the circumferential surface of the main body portion 445a. A portion of an inner circumferential surface of the cylinder 441 corresponding to an opening position of the passage 445c is provided with the port 4d and is recessively formed. The recessed space portion forms a "third chamber 4C".

The projection portion 445b projects towards the cylinder bottom surface side from a center portion of an end surface of the cylinder bottom surface side of the main body portion 445a. The projection portion 445b is formed so that the diameter thereof is smaller than the diameter of the through passage 444a of the valve seat portion 444. The projection portion 445b is coaxially provided relative to the through passage 444a. A tip end of the projection portion 445b is spaced apart from the ball valve 442 towards the cylinder opening side by a predetermined distance. A passage 445d is formed at the projection portion 445b so that the passage 445d extends in the cylinder axis direction and opens at a center portion of an end surface of the projection portion 445b. The passage 445d extends into the inside of the main body portion 445a and is connected to the passage 445c.

A space defined by the end surface of the cylinder bottom surface side of the main body portion 445a, an outer peripheral surface of the projection portion 445b, the inner circumferential surface of the cylinder 441, the valve seat portion 444 and the ball valve 442 is referred to as a "second chamber 4B". The second chamber 4B is in communication with the ports 4d and 4e via the passages 445d and 445c and the third chamber 4C with the projection portion 445b and the ball valve 442 not in contact.

The sub-piston 446 includes a sub main body portion 446a, a first projection portion 446b and a second projection portion 446c. The sub main body portion 446a is formed in a substantially columnar shape. The sub main body portion 446a is arranged within the cylinder 441 in a coaxial and liquid-tight manner on the cylinder opening side of the main body portion 445a. The sub main body portion 446a is slidably movable in the axial direction. A damper mechanism Z is provided at the end of the cylinder bottom surface side of the sub-piston 446.

The first projection portion 446b is formed in a substantially columnar shape having a diameter smaller than the diameter of the sub main body portion 446a and projects from a center portion of an end surface of the cylinder bottom surface side of the sub main body portion 446a. The first projection portion 446b is in contact with the end surface of the cylinder bottom surface side of the sub main body portion 446a. The second projection portion 446c is formed in the same shape as the first projection portion 446b. The second projection portion 446c projects from a center portion of an end surface of the cylinder opening side of the sub main body portion 446a. The second projection portion 446c is in contact with the cover member 441b.

A space defined by the end surface of the cylinder bottom surface side of the sub main body portion 446a, an outer peripheral surface of the first projection portion 446b, an end surface of the cylinder opening side of the control piston 445 and the inner circumferential surface of the cylinder 441 is referred to as a "first pilot chamber 4D". The first pilot chamber 4D is in communication with the pressure decreasing valve 41 via the port 4f and the conduit 413 and is in fluid communication with the pressure increasing valve 42 via the port 4g and the conduit 421. The damper mechanism Z is structured similar to the stroke simulator 21 and is provided in the wall portion of the sub-piston 446 facing to the first pilot chamber 4D. The damper mechanism Z is equipped with a piston portion Z2 which is biased towards the first pilot chamber 4D by a biasing member Z1. The rigidity of the first pilot chamber 4d is varied in response to the pressure in the first pilot chamber 4D (hereinafter referred to as "pilot pressure") by the damper mechanism Z in accordance with the PV (Pressure-Volume) characteristics.

A space defined by the end surface of cylinder opening side of the sub main body portion 446a, an outer peripheral surface of the second projection portion 446c, the cover member 441b and the inner circumferential surface of the cylinder 441 is referred to as a "second pilot chamber 4E". The second pilot chamber 4E is in communication with the port 11g via the port 4h and the conduits 511 and 51. Each of the chambers 4A through 4E is filled with the operating fluid. The pressure sensor 74 is a sensor that detects the servo pressure to be supplied to the servo chamber 1A and is connected to the conduit 163. The pressure sensor 74 sends the detected signal to the brake ECU 6.

As explained, the regulator 44 includes the control piston 445 which is driven by the difference between the force corresponding to the pilot pressure and the force corresponding to the servo pressure and the volume of the first pilot chamber 4D changes in response to the movement of the control piston 445 and the more the liquid flowing into or out of the first pilot chamber 4D increases, the more the amount of the movement of the control piston 445 from the reference point thereof increases under the equilibrium state that the force corresponding to the pilot pressure balances with the force corresponding to the servo pressure. Thus, the flowing amount of the liquid flowing into or out of the servo chamber 1A is structured to be increasing. In other words, the regulator 44 is configured that the liquid amount corresponding to the difference in pressure between the pilot pressure and the servo pressure flows into or out of the servo chamber 1A.

(Actuator 5)

The actuator 5 is provided between the first master chamber 1D and the second master chamber 1E which generate the master pressure and the wheel cylinders 541 through 544. The actuator 5 and the first master chamber 1D are in communication through the conduit 51 and the actuator 5 and the second master chamber 1E are in communication through the conduit 52. The actuator 5 adjusts the brake hydraulic pressure to be supplied to the wheel cylinders 541 through 544 based on the instructions from the brake ECU 6. The actuator 5 according to the embodiment forms an ABS (anti-lock brake system). Conceptually, the actuator 5 is an anti-lock brake system which is formed at least by a reservoir 533, to which the operating fluid in the wheel cylinders 541 through 544 is discharged, an inlet valve (corresponding to a holding valve 531 which will be explained later) provided between the master chamber 1D, 1E and the wheel cylinders 541 through 544 and an outlet valve (corresponding to a pressure decreasing valve 532 which will be explained later) provided between the wheel cylinders 541 through 544 and the reservoir 533. The actuator 5 is formed with four channel system corresponding to the respective wheel cylinders 541 through 544. Each of the four channels is structured same with one another and accordingly, one of the channels will be explained here as the actuator and explanation of the other channels will be omitted.

The actuator 5 (1 channel) is formed by a holding valve 531, a pressure decreasing valve 532, the reservoir 533, a pump 534 and a motor 535. The holding valve 531 is disposed between the first master chamber 1D and the wheel cylinder 544. The holding valve is an electromagnetic valve and the first opening is connected to the conduit 51 and a second opening is connected to the wheel cylinder 544 and the first opening of the pressure decreasing valve 532. The holding valve 531 is an electromagnetic valve which generates a pressure differential between the both openings and is a normally open valve which becomes an open state under non-energized state. The state of the holding valve 531 is switched over between the two states, one being a communication state in which the both openings are in communication (non-pressure differential state) and the other being a pressure differential state in which a pressure difference is generated between the two openings by the instructions of the brake ECU 6. The pressure differential state can be controllable depending on the magnitude of the control current based on the instructions from the brake ECU 6. The pressure decreasing valve 532 is disposed between the wheel cylinder 544 and the reservoir 533. The pressure decreasing valve 532 establishes or interrupts the fluid communication between the wheel cylinder 544 and the reservoir 533 in response to the instructions from the brake ECU 6. The pressure decreasing valve 532 is a normally open type valve which is in a closed state under a non-energized state.

The reservoir 533 has a hydraulic pressure chamber therein for reserving the operating fluid. The opening of the reservoir 533 is connected to the other opening of the pressure decreasing valve 532 and the pump 534 via conduit. The pump 534 is driven by the motor 535 and returns the operating fluid in the reservoir 533 to the master cylinder 1 side. The motor 535 is driven in response to the instructions from the brake ECU 6.

The function of the actuator 5 will be briefly explained hereinafter. When both the holding valve 531 and the pressure decreasing valve 532 are in non-energized state (normal braking state), the holding valve 531 is in valve opening state and the pressure decreasing valve 532 is in valve closed state. Therefore, the master chambers 1D and 1E are in communication with the wheel cylinders 541 through 544. Under such state, the wheel pressure which corresponds to the hydraulic pressure in the wheel cylinders 541 through 544 is controlled (a pressure increasing control) in response to the brake operation. Further, when the pressure differential state of the holding valve 531 is controlled, maintaining the pressure decreasing valve 532 to be in the closed state, the wheel pressure is controlled to be increased in response to the controlling state of the holding valve 531. Further, when the holding valve 531 is in the energized state and the pressure decreasing valve 532 is in non-energized state (valve closed state), the wheel pressure is maintained. In other words, in such state, the wheel pressure is controlled to be held. When both of the holding valve 531 and the pressure decreasing valve 532 are in the energized state, the fluid communication between the wheel cylinders 541 through 544 and the reservoir 533 is established to control the wheel pressure to be decreased. By such pressure holding and decreasing controls, the wheel cylinder pressure is controlled not to lock the rotation of wheels of the vehicle. Such wheel pressure control by the actuator 5 is made to each of the wheel cylinders 541 through 544 independently, depending on the situation.

(Brake ECU 6)

The brake ECU 6 is an electronic control unit and includes a microcomputer. The microcomputer includes an input/output interface, CPU, RAM, ROM and a memory portion such as non-volatile memory, connected with one another through bus communication. The brake ECU 6 is connected to the various sensors 71 through 76 for controlling each of the electromagnetic valves 22, 23, 41 and 42, the motor 433 and the actuator 5 and so on. The operating amount (stroke amount) of brake pedal 10 operated by the operator of the vehicle is inputted to the brake ECU 6 from the stroke sensor 71, a detecting signal, which shows whether or not the operation of the brake pedal 10 by the operator of the vehicle is performed, is inputted to the brake ECU 6 from the brake stop switch 72, the reaction force hydraulic pressure of the second hydraulic pressure chamber 1C or the pressure of the first hydraulic pressure chamber 1B is inputted to the brake ECU 6 from the pressure sensor 73, the servo pressure supplied to the servo chamber 1A is inputted to the brake ECU 6 from the pressure sensor 74, the accumulator hydraulic pressure of the accumulator 431 is inputted to the brake ECU 6 from the pressure sensor 75 and each wheel speed of the respective vehicle wheels 5FR, 5FL, 5RR and 5RL is inputted to the brake ECU 6 from each of the wheel speed sensors 76.

(Brake Control)

The brake control by the brake ECU 6 will be explained hereinafter. The brake control is a normal control of hydraulic pressure braking force. In other words, the brake ECU 6 energizes the first control valve 22 and opens the first control valve 22 and energizes the second control valve 23 and closes the second control valve 23. By this closing of the second control valve 23, the communication between the second hydraulic pressure chamber 1C and the reservoir 171 is interrupted and by the opening of the first control valve 22, the communication between the first hydraulic pressure chamber 1B and the second hydraulic pressure chamber 1C is established. Thus, the brake control is a brake mode for controlling the servo pressure of the servo chamber 1A by controlling the pressure decreasing and pressure increasing valves 41 and 42 under the first control valve 22 being opened and the second control valve 23 being closed. The pressure decreasing valve 41 and the pressure increasing valve 42 may be said to be valve devices which adjust the flow-rate of the operating fluid which flows into or out of the first pilot chamber 4D. Under this brake control, the brake ECU 6 calculates a required braking force required by the driver of the vehicle based on the operating amount of the brake pedal 10 detected by the stroke sensor 71 (displacement amount of the input piston 13) or the operating force of the brake pedal 10 (for example, the hydraulic pressure detected at the pressure sensor 73). Then, based on the calculated required braking force, a target servo pressure is set. The pressure decreasing valve 41 and the pressure increasing valve 42 are controlled so that the actual servo pressure, which is the servo pressure detected at the pressure sensor 74 approximates the target servo pressure.

In more detail, under the state that the brake pedal 10 is not depressed, the brake control becomes the state as explained above, i.e., the brake control becomes the state that the ball valve 442 closes the through passage 444a of the valve seat portion 444. Under this control state, the pressure decreasing valve 41 is in an open state and the pressure increasing valve 42 is in a closed state. In other words, the fluid communication between the first chamber 4A and the second chamber 4B is interrupted. The second chamber 4B is in communication with the servo chamber 1A via the conduit 163 to keep the hydraulic pressures in the two chambers 4B and 1A to be mutually in an equal level. The second chamber 4B is in communication with the third chamber 4C via the passages 445c and 445d of the control piston 445. Accordingly, the second chamber 4B and the third chamber 4C are in communication with the reservoir 171 via the conduits 414 and 161. One side of the first pilot chamber 4D is closed by the pressure increasing valve 42, while the other side thereof is connected to the reservoir 171 via the pressure decreasing valve 41. The pressures of the first pilot chamber 4D and the second chamber 4B are kept to the same pressure level. The second pilot chamber 4E is in communication with the first master chamber 1D via the conduits 511 and 51 thereby keeping the pressure level of the two chambers 4E and 1D to be mutually equal to each other.

From this state, when the brake pedal 10 is depressed, the brake ECU 6 controls the pressure decreasing valve 41 and the pressure increasing valve 42 based on the target servo pressure. In other words, the brake ECU 6 controls the pressure decreasing valve 41 to close and controls the pressure increasing valve 42 to open. When the pressure increasing valve 42 is opened, a communication between the accumulator 431 and the first pilot chamber 4D is established. When the pressure decreasing valve 41 is closed, a communication between the first pilot chamber 4D and the reservoir 171 is interrupted. The pressure in the first pilot chamber 4D can be raised by the highly pressurized operating fluid supplied from the accumulator 431. By the increase of the pressure in the first pilot chamber 4D, the control piston 445 slidably moves towards the cylinder bottom surface side. Then the tip end of the projecting portion 445b of the control piston 445 is brought into contact with the ball valve 442 to close the passage 445d by the ball valve 442. Thus, the fluid communication between the second chamber 4B and the reservoir 171 is interrupted.

By further slidable movement of the control piston 445 towards the cylinder bottom surface side, the ball valve 442 is pushed towards the cylinder bottom surface side by the projection portion 445b to thereby separate the ball valve 442 from the valve seat surface 444b. This will allow establishment of fluid communication between the first chamber 4A and the second chamber 4B through the through passage 444a of the valve seat portion 444. As the highly pressurized operating fluid is supplied to the first chamber 4A from the accumulator 431, the hydraulic pressure in the second chamber 4B is also increased by the communication therebetween.

The brake ECU 6 controls the fluid passage downstream of the pressure increasing valve 42 to become large and at the same time controls the fluid passage downstream of the pressure decreasing valve 41 to become small so that the larger the displacement amount of the input piston 13 (operating amount of the brake pedal 10) detected by the stroke sensor 71, the higher the pilot pressure in the first pilot chamber 4D becomes. In other words, the larger the displacement amount of the input piston 13 (operating amount of the brake pedal 10), the higher the pilot pressure becomes and accordingly, the higher the servo pressure becomes. The servo pressure can be obtained from the pressure sensor 74 and can be converted into the pilot pressure.

As the pressure increase of the second chamber 4B, the pressure in the servo chamber 1A which is in fluid communication with the second chamber 4B increases. By the pressure increase in the servo chamber 1A, the first master piston 14 advances forward and the pressure in the first master chamber 1D increases. Then the second master piston 15 advances forward also and the pressure in the second master chamber 1E increases. By the increase of the pressure in the first master chamber 1D, highly pressurized operating fluid is supplied to the actuator 5 and the second pilot chamber 4E. The pressure in the second pilot chamber 4E increases, but since the pressure in the first pilot chamber 4D is also increased, the sub piston 446 does not move. Thus, the highly pressurized (master pressure) operating fluid is supplied to the actuator 5 and a friction brake is operated to control brake operation of the vehicle. The force advancing the first master piston 14 forward under the "brake control" corresponds to a force corresponding to the servo pressure. When the brake operation is released, as opposite to the above, the pressure decreasing valve 41 is open and the pressure increasing valve 42 is closed to establish the fluid communication between the reservoir 171 and the first pilot chamber 4D. Then, the control piston 445 retreats and the vehicle returns to the state before depression of the brake pedal 10.

(Dead Zone)

A dead zone is set to the target servo pressure. The dead zone has the same width at both positive side and negative side relative to the central portion of the target servo pressure. The brake ECU 6 executes a hydraulic pressure control judging that the servo pressure has substantially reached to the target servo pressure, when the actual servo pressure (hydraulic pressure measured by the pressure sensor 74) enters the dead zone area. In other words, as long as the actual servo pressure is within the dead zone area, the brake ECU 6 does not execute control to have the actual servo pressure to follow to the target servo pressure, even the target servo pressure varies. In other words, the brake ECU 6 maintains the driving force of the servo pressure generating device 4 when the actual servo pressure which is the hydraulic pressure of the servo chamber 1A (corresponding to "the control subject chamber") is within the dead zone area which is set based on the target servo pressure (target value of the servo pressure). When the actual servo pressure is within the dead zone area, a holding control that tries to hold the servo pressure is executed, when the actual servo pressure is higher than the upper limit of the dead zone, a pressure decreasing control that tries to decrease the servo pressure is executed and when the actual pressure is lower than the lower limit of the dead zone, a pressure increasing control that tries to increase the servo pressure is executed. The driving force of the servo pressure generating device 4 can be said to agree to the servo pressure (or the pilot pressure). The target servo pressure is a target value of the servo pressure decided in response to the brake operation by the operator of the vehicle.

(Dead Zone Widening Control)

Next, the dead zone widening control by the brake ECU 6 will be explained hereinafter. The vehicle brake device according to the embodiment is structured such that a pulsation of the master pressure is generated in response to the operation of the actuator 5 due to a variation of servo pressure caused by the variation of the master pressure. The brake ECU 6 is provided with a control portion 61 which executes the brake control as explained above, a rigidity information obtaining portion 62, a dead zone setting portion 63 and a friction coefficient presuming portion 64, as the function. The control portion 61 controls the pressure decreasing valve 41 and the pressure increasing valve 42 based on the actual servo pressure, the target servo pressure and the dead zone.

The rigidity information obtaining portion 62 obtains the rigidity information on the rigidity of the servo chamber 1A. Specifically, the rigidity information obtaining portion 62 obtains the servo pressure information (corresponding to "subject pressure information") relating the servo pressure. The rigidity information obtaining portion 62 obtains the servo pressure information from the pressure sensor 74. In other words, in this embodiment, the servo pressure information is the actual servo pressure which corresponds to the value of the pressure sensor 74. In this embodiment, the rigidity information obtaining portion 62 is provided with a filter 621. Therefore, the servo pressure information obtained by the rigidity information obtaining portion 62 is an information on an amplitude (vibration) lessened through the filter 621. Thus, the pulsation added to the servo pressure information can be suppressed and an information which is an averaged and less deviated information can be utilized.

Further, the rigidity information obtaining portion 62 obtains the road surface information relating to a friction coefficient of the running road surface, as the rigidity information. In this embodiment, the road surface information is the friction coefficient (μ) of the road surface presumed by the friction coefficient presuming portion 64. In other words, the rigidity information obtaining portion 62 obtains the road surface information from the friction coefficient presuming portion 64. The rigidity information obtaining portion 62 provides (sends) the rigidity information to the dead zone setting portion 63.

The dead zone setting portion 63 sets the dead zone based on the rigidity information which is obtained from the rigidity information obtaining portion 62 such that the higher the rigidity of the servo chamber 1A, or the higher the probability of rigidity increase of the servo chamber 1A, the wider the dead zone is set. The rigidity of the regulator 44 which is connected to the servo chamber 1A through the conduit 163 has an influence on the rigidity of the servo chamber 1A. In other words, the rigidity of the servo chamber 1A can be said to correspond to the rigidity of the entire system including the servo chamber 1A, the conduit 163 and the regulator 44. Since the servo chamber 1A and the second chamber 4B are in fluid communication, the pressure in the first pilot chamber 4D and the pressure in the second chamber 4B are maintained to the same level of pressure in structural point of view. Accordingly, the rigidity of the first pilot chamber 4D has an influence on the rigidity of the servo chamber 1A. According to this embodiment, the rigidity of the servo chamber 1A and the conduit 163 is set to be high and accordingly, the rigidity of the first pilot chamber 4D having a damper mechanism Z has the largest influence on the rigidity of the entire system itself. In other words, the rigidity of the servo chamber 1A can be considered to correspond to the rigidity of the first pilot chamber 4D. The brake ECU 6 of this embodiment is structured to regard the rigidity of the first pilot chamber 4D as the rigidity of the servo chamber 1A.

Figure 4:
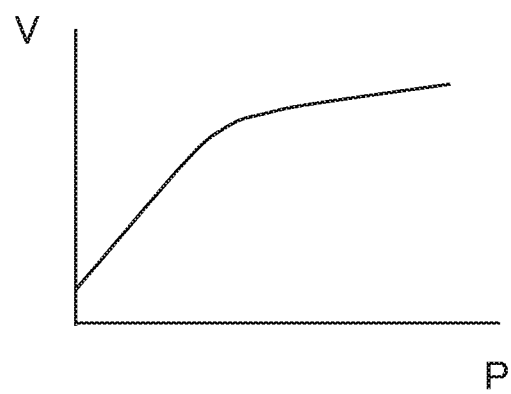
FIG. 4 is an explanatory diagram for explaining PV characteristics of the first pilot chamber 4D according to the embodiment.

The rigidity of the first pilot chamber 4D varies in response to the pilot pressure based on the PV characteristics of the first pilot chamber 4D which includes the PV characteristics of the damper mechanism Z. For example, the PV characteristics is a characteristics in which the higher the pressure, the higher the rigidity becomes. The pilot pressure corresponds to the actual servo pressure. Accordingly, the rigidity of the first pilot chamber 4D can be calculated (presumed) from the servo pressure information (actual servo pressure) and the PV characteristics of the damper mechanism Z. The system characteristics of the rigidity (in this embodiment, the PV characteristics of the first pilot chamber 4D) is memorized in advance in the dead zone setting portion 63. As shown in FIG. 4, the PV characteristics of the first pilot chamber 4D is set such that the higher the pressure, the higher the rigidity becomes (gradient "dV/dP" becomes small). After the bottoming of the piston Z2, the rigidity further becomes high. The dead zone setting portion 63 sets the dead zone based on the servo pressure information which is obtained from the rigidity information obtaining portion 62 such that the higher the rigidity of the servo chamber 1A calculated from the servo pressure information, i.e., the higher the rigidity of the first pilot chamber 4D, the wider the dead zone setting portion 63 sets the dead zone. The control for widening the dead zone based on the servo pressure information (control at the high pedal depression force operation) is referred to hereinafter as the "first dead zone widening control".

The dead zone setting portion 63 memorizes therein a first map, in which the relationship between the servo pressure information (actual servo pressure) and the dead zone width is set. The first map is used for the first dead zone widening control. The dead zone setting portion 63 decides the width of the dead zone based on the servo pressure information and the first map. For example, the dead zone setting portion 63 may change the setting of the dead zone width from a normal dead zone width to the first dead zone width (the first dead zone width is wider than the normal dead zone width), when the actual servo pressure becomes equal to or more than the predetermined value. The relationship between the actual servo pressure and the dead zone width may be set stepwise or functionally (for example, linear or quadratic function) or may be a combination of these.

Further, during the vehicle travelling on a road surface with a low friction coefficient, the ABS (actuator 5) may be operated in order to prevent he wheels of the vehicle from locking. Therefore, upon travelling on a road surface with a low friction coefficient, the ABS is actuated which may give the operator of the vehicle a feeling that the brake is not sufficiently performed, comparing the case that the vehicle is travelling on a road surface with a relatively high friction coefficient (travelling on a normal road surface). Accordingly, the operator of the vehicle tends to more strongly depress the brake pedal 10 than is necessary when travelling on a road with low friction coefficient. As explained, the probability of strong depression of the brake pedal 10 becomes high when travelling on a road with low friction coefficient. In other words, the lower the friction coefficient, the higher the probability of increase of the actual servo pressure and accordingly, the increase of the master pressure becomes. The high probability of increasing of the actual servo pressure corresponds to the high probability of increasing of the rigidity of the first pilot chamber 4D, in view of the PV characteristics of the first pilot chamber 4D.

Therefore, it is noted that the dead zone setting portion 63 widens the dead zone width based on the road surface information from the friction coefficient presuming portion 64 based on the fact that the lower the friction coefficient, the higher the probability of the increase of the rigidity becomes. As explained, the control (travelling control under a low friction coefficient road surface) for widening the dead zone based on the road surface information is referred to as the "second dead zone widening control".

The dead zone setting portion 63 memorizes therein a second map, in which the relationship between the road surface information (the friction coefficient) and the dead zone width is set. The second map is used for the second dead zone widening control. The dead zone setting portion 63 decides the width of the dead zone based on the road surface information and the second map. For example, the dead zone setting portion 63 may change the setting of the dead zone width from a normal dead zone width to the second dead zone width (the second dead zone width is wider than the normal dead zone width), when the friction coefficient becomes less than the predetermined value. The relationship between the friction coefficient and the dead zone width may be set stepwise or functionally (for example, linear or quadratic function) or may be a combination of these.

The friction coefficient presuming portion 64 presumes (calculates) the friction coefficient of the road surface by a well-known method. The friction coefficient presuming portion 64 calculates the road surface friction coefficient based on the wheel speed information obtained from the each wheel speed sensor 76 and/or an acceleration information obtained from the acceleration sensor (G-sensor) 8 equipped in the vehicle. For example, the friction coefficient presuming portion 64 calculates the change ratio of the slip ratio (for example, speed ratio between the drive wheel speed and the driven wheel speed) obtained from the each wheel speed information and calculates the change ratio of the acceleration from the acceleration information. Then, the friction coefficient presuming portion 64 presumes (calculates) the friction coefficient based on the change ratio of the slip ratio and the change ratio of the acceleration. The friction coefficient presuming portion 64 sends (provides) the presumed result to the rigidity information obtaining portion 62 as the road surface information. The acceleration sensor 8 may be arranged inside of the brake ECU 6 or another acceleration sensor which is used in another ECU or the like may be used as the acceleration sensor of this embodiment.

According to the dead zone setting portion 63 of this embodiment judges (presumes) whether the or not the vehicle is travelling on a low friction coefficient road surface and the brake pedal is strongly depressed based on the target wheel pressure, the target master pressure (target servo pressure) and the acceleration information (the value of the acceleration sensor 8) etc., without using the presumption by the friction coefficient presuming portion 64. The target wheel pressure corresponds to for example, the target value of the wheel pressure which is decided by the brake ECU 6 based on the operating amount of the brake pedal 10 (pedal stroke and/or pedal depression force) and the information on the road surface condition (the friction coefficient etc). The target wheel pressure is set at each wheel cylinder 541 through 544.

The dead zone setting portion 63 judges that "the vehicle is travelling on a low friction coefficient road surface and the brake pedal is being depressed strongly", when the target wheel pressure at each wheel cylinder 541 through 544 is lower than the first threshold value, when the target master pressure (target servo pressure) is higher than the second threshold value, and when the vehicle deceleration is lower than the third threshold value. In this case, the dead zone setting portion 63 widens the dead zone by the amount larger than the amount widened by the first or the second dead zone widening control. In other words, in this case, the dead zone setting portion 63 sets the dead zone width to a third dead zone width which is wider than the first dead zone width and the second dead zone width. The threshold values are defined in advance. The control which widens the dead zone based on the target wheel pressure, the target servo pressure and the acceleration (at travelling on the low friction coefficient road surface and at the same time at strong depressing on the brake pedal) is referred to as "third dead zone widening control". In such third dead zone widening control, the information on the target wheel pressure, the target servo pressure and the acceleration is the rigidity information (including road surface information). It can be said that the dead zone setting portion 63 according to the embodiment sets the dead zone such that the larger the deviation between the master pressure and the wheel pressure, the wider the dead zone setting portion 63 sets the dead zone.

On the other hand, the dead zone setting portion 63 stops the third dead zone widening control when the vehicle travels on to a Belgian (stone-paved) road or a bad road, while travelling under the third dead zone widening control. In other words, in such case the dead zone setting portion 63 changes the control from the third dead zone widening control to the first (or the second) dead zone widening control to reduce the widening amount of the dead zone. Whether or not the vehicle is travelling on a specific road surface, such as, a stone-paved road surface or a bad road surface can be presumed by the deviation between the target wheel pressure and the target master pressure (target servo pressure). When the road surface is changed from the low friction coefficient road surface to the specific road surface, the locking pressure in the ABS control temporarily increases and necessary wheel pressure may possibly increase. When the locking pressure increases and accordingly the target wheel pressure increases, the deviation between the target wheel pressure and the target servo pressure becomes small. The dead zone setting portion 63 judges that the road surface has changed to a specific road surface when the deviation between the target wheel pressure and the target servo pressure becomes smaller than a predetermined threshold value in the third dead zone widening control and stops the third dead zone widening control. It can be said that the dead zone setting portion 63 according to the embodiment sets the dead zone such that the smaller the deviation between the master pressure and the wheel pressure, the narrower the dead zone is set.

Figure 5:
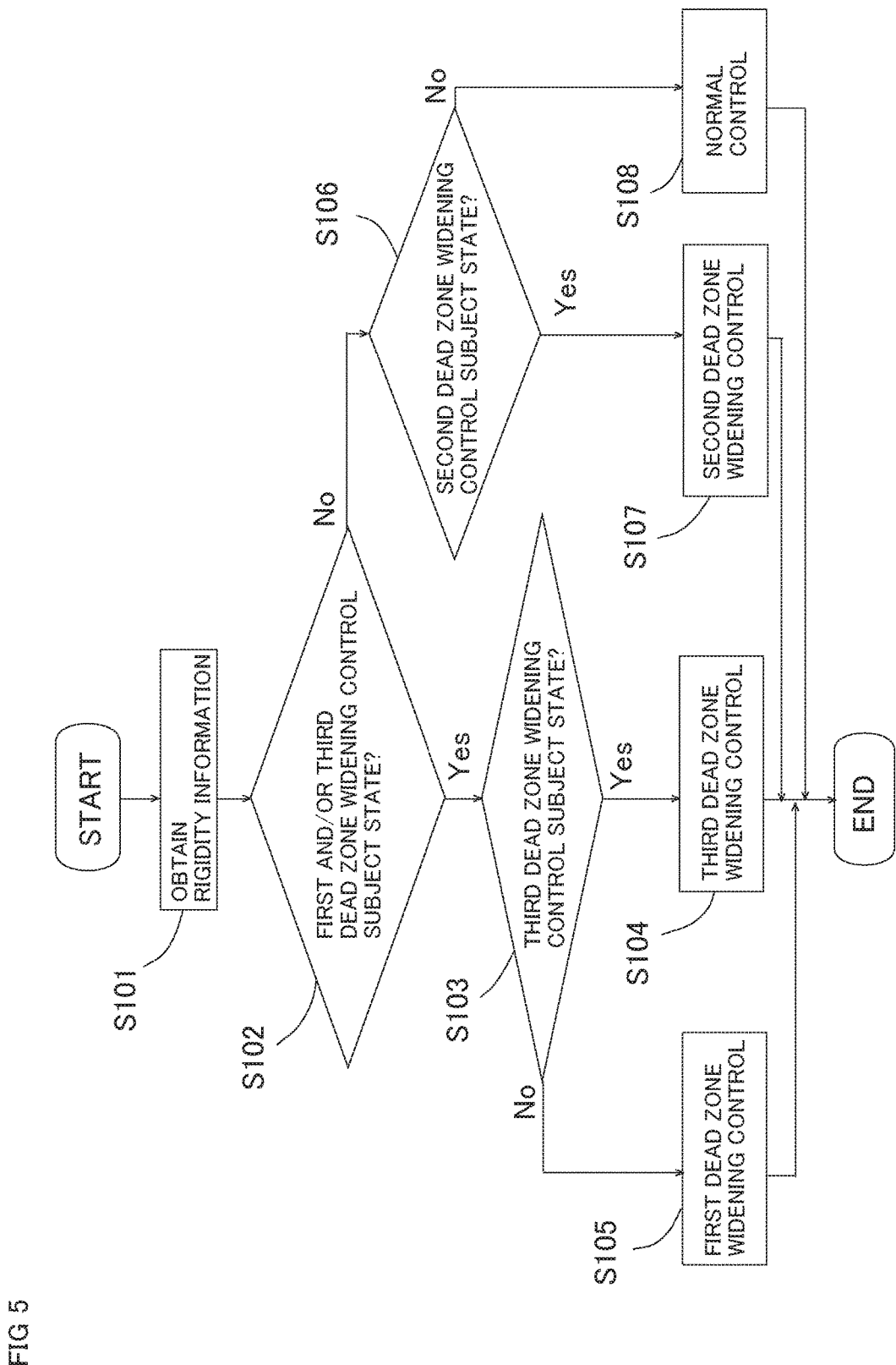
FIG. 5 is a flowchart which explains the dead zone widening control according to the embodiment.

Here, one example of the flow of dead zone widening control according to this embodiment will be explained with reference to the flowchart in FIG. 5. First, the rigidity information obtaining portion 62 obtains the rigidity information (actual servo pressure, friction coefficient, target wheel pressure, target servo pressure and acceleration) at the step S101. Then, the dead zone setting portion 63 judges whether or not the vehicle state falls under at least one of the states that is subject to the first dead zone widening control and the third dead zone widening control based on the rigidity information (at the step S102). In more specifically, the dead zone setting portion 63 judges whether or not "the actual servo pressure is equal to or more than a predetermined value" and whether or not "the target wheel pressure at each wheel is lower than the first threshold value and the target servo pressure is higher than the second threshold value and at the same time the vehicle deceleration is lower than the third threshold value". If the actual servo pressure is equal to or more than the predetermined value, the vehicle state falls under the state subject to the first dead zone widening control. Further, if the target wheel pressure at each wheel is lower than the first threshold value and the target servo pressure is higher than the second threshold value and at the same time the vehicle deceleration is lower than the third threshold value, the vehicle state falls under the state subject to the third dead zone widening control.

When the vehicle state is judged to be at least one of the states that is subject to the first dead zone widening control and the third dead zone widening control (at the step S102: "Yes"), the dead zone setting portion 63 judges whether or not the vehicle state falls under the state subject to the third dead zone widening control (at the step S103). The dead zone setting portion 63 executes the third dead zone widening control (at the step S104) when the vehicle state falls under only the state subject to the third dead zone widening control and the state subject to both the third dead zone widening control and the first dead zone widening control (at the step S103: "Yes"). On the other hand, the dead zone setting portion 63 executes the first dead zone widening control (at the step S105) when the vehicle state falls under only the state subject to the first dead zone widening control (at the step S103: "No").

When the vehicle state is judged to be the state that does not fall under the state subject to the first dead zone widening control and the third dead zone widening control (at the step S102: "No"), the dead zone setting portion 63 judges whether or not the vehicle state falls under the state subject to the second dead zone widening control (S106). In more specifically, the dead zone setting portion 63 judges whether or not the friction coefficient of the road surface information is equal to or less than the predetermined value. If the friction coefficient is judged to be equal to or less than the predetermined value, the vehicle state falls under the state subject to the second dead zone widening control. When the vehicle state is judged to fall under the state subject to the second dead zone widening control (at the step S106: "Yes"), the dead zone setting portion 63 executes the second dead zone widening control (at the step S107). On the other hand, if the vehicle state is judged not to fall under the state subject to the second dead zone widening control (at the step S106: "No"), the dead zone setting portion 63 sets the dead zone to a normal dead zone which has been set in advance (for example, dead zone width based on the normal dead zone map) at the step S108. The brake ECU 6 executes the dead zone widening control every predetermined time period.

(Operation and Effect)

As explained in the vehicle brake device according to the embodiment, the servo pressure changes in response to the change of the master pressure and the master pressure generates pulsation accompanied by the operation of the actuator 5. The actual servo pressure pulsates in response to the pulsation of the master pressure and every time the pulsating actual servo pressure goes out of the dead zone, the servo pressure generating device 4 is operated to so that the actual servo pressure approximates the target servo pressure. In other words, the pressure decreasing and increasing controls are repeated within a short period of time in response to the pulsation cycle of the master pressure, which may lead to excess operations of the pressure decreasing valve 41 and the pressure increasing valve 42. The pulsation of the master pressure is generated in response to the pressure adjusting of the actuator 5 (here in this embodiment, ABS control). For example, the actuator 5 can adjust the wheel pressure at each wheel cylinder 541 through 544 independently and, accordingly, it is possible to perform wheel pressure control such that when the wheel pressure in one wheel cylinder is adjusted to decrease the pressure in the wheel cylinder while the other wheel pressures in the other wheel cylinders are adjusted to increase the pressure therein. Therefore, the pulsation cycle of the master pressure becomes shortened and in response thereto, the cycle of the pressure decreasing valve 41 and the pressure increasing valve 42 operations becomes shortened according to the known art device.

For example, when the wheel pressure of the wheel cylinder 541 is controlled to be increasing, a holding valve 531 which is provided in the circuit corresponding to the wheel cylinder 541 opens to allow the operating fluid in the second master chamber 1E into the wheel cylinder 541. On the other hand, when the wheel pressure of the wheel cylinder 541 is controlled to be decreasing, the corresponding holding valve 531 closes to return the operating fluid in the wheel cylinder 541 to the reservoir 533. The operating fluid in the reservoir 533 returns to the first master chamber 1D and the second master chamber 1E by the pumping operation of the pump 534 (pump-back). Thus, according to the ABS control (operation of the actuator 5 to the each wheel cylinder 541 through 544), the operating fluid flows into the first and the second master chambers 1D and 1E from the wheel cylinders 541 through 544 or flows out of the wheel cylinders 541 through 544 into the first and the second master chambers 1D and 1E. The master pressure pulsates accompanying the flowing in-and-out of the operating fluid between the master chambers and the wheel cylinders and the fluid amount rigidity of the operating fluid. The higher the rigidity of the servo chamber 1A, which generates the servo pressure corresponding to the master pressure, i.e., the higher the rigidity (fluid amount rigidity) of the first pilot chamber 1D, the larger the pressure change relative to the flow in and out fluid amount becomes and the larger the pulsation of the master pressure becomes. In other words, the higher the rigidity of the servo chamber 1A, the more the excess operations of the pressure decreasing and increasing valves 41 and 42 are generated. Further, if the operating cycle of the pressure decreasing valve 41 and the pressure increasing valve 41 cannot catch up with the pulsation cycle of the master pressure, such pulsation (vibration) may diverge.

Figure 6:
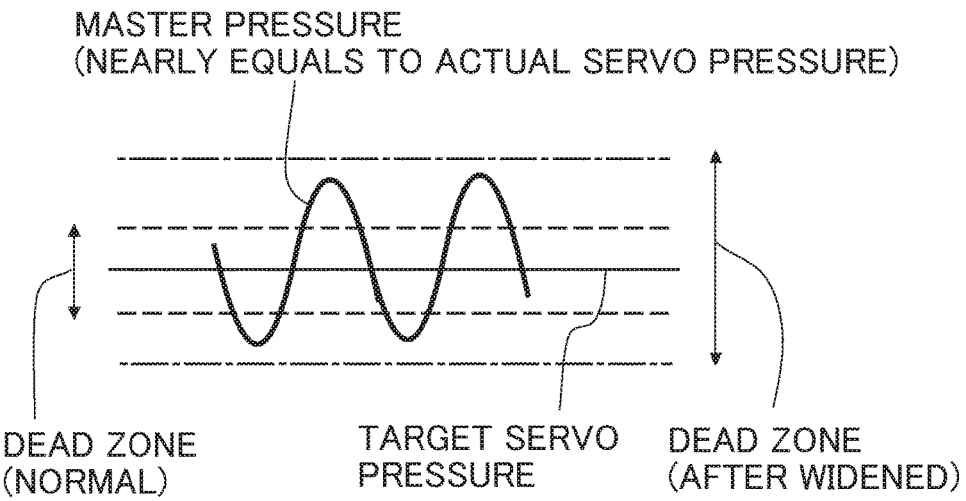
FIG. 6 is an explanatory diagram which explains the dead zone widening control according to the embodiment.

According to the embodiment, the higher the rigidity of the servo chamber 1A, or the higher the probability of rigidity increase of the servo chamber 1A, the wider the dead zone becomes. For example, in FIG. 6, the dead zone setting portion 63 widens the dead zone to a predetermined dead zone width (for example, first dead zone width, second dead zone width or third dead zone width) when the rigidity is high or the probability of rigidity increase is high. Thus, the pulsation of the actual servo pressure relative to the pulsation of the master pressure falls within the dead zone and the brake ECU 6 maintains the holding control and the excess operations of the pressure decreasing valve 41 and the pressure increasing valve 42 can be suppressed. Accordingly, in the embodiment, the durability of the component of the control subject device (in this embodiment, the pressure decreasing valve 41 and the pressure increasing valve 42) can be improved. The widening amount of the width of the dead zone can be set structurally, considering the hysteresis of the regulator 44 or the like. The dead zone width can be set to become wider than the presumable pulsation amplitude.

Further, as the first dead zone widening control, by using the actual servo pressure information (servo pressure information) which is the subject of control as the rigidity information the rigidity of the servo chamber 1A can be easily and appropriately presumed. Further, as the second dead zone widening control, in the vehicle brake device equipped with the ABS control, by using the road surface information relating to the friction coefficient as the rigidity information the highly probable case that the rigidity becomes high can be easily and appropriately detected.

Further, as the third dead zone widening control, by setting the dead zone such that the larger the deviation between the master pressure and the wheel pressure, wider the dead zone is set, under a situation that a sudden flow-in and out of the operating fluid may occur, the excess operations of the pressure decreasing valve 41 and pressure increasing valve 42 can be appropriately suppressed. For example, the larger the deviation between the master pressure and the wheel pressure, more steeply the operating fluid flows out from the first master chamber 1D and or the second master chamber 1E under the pressure increasing control. This may lead to the larger wheel pressure than the target wheel pressure. In such case, the pressure decreasing control is executed thereafter to pump back the operating fluid. As explained, when the deviation between the master pressure and the wheel pressure is large, the flowing in and out amount of the operating fluid relative to the first master chamber 1D and the second master chamber 1E becomes steep and the amplitude of pulsation of the master pressure tends to become large. Actually, an example of the case where the deviation between the master pressure and the wheel pressure become large is the case that the friction coefficient of the road surface is low and at the same time the brake pedal 10 is depressed strongly. According to the embodiment, the vehicle state is detected based on the target wheel pressure, the target servo pressure and the acceleration to widen the dead zone thereby suppressing the excess operations of the pressure decreasing valve 41 and the pressure increasing valve 42. According to the embodiment, it can be said that the dead zone can be widened in response to the vehicle situation.

Figure 7:
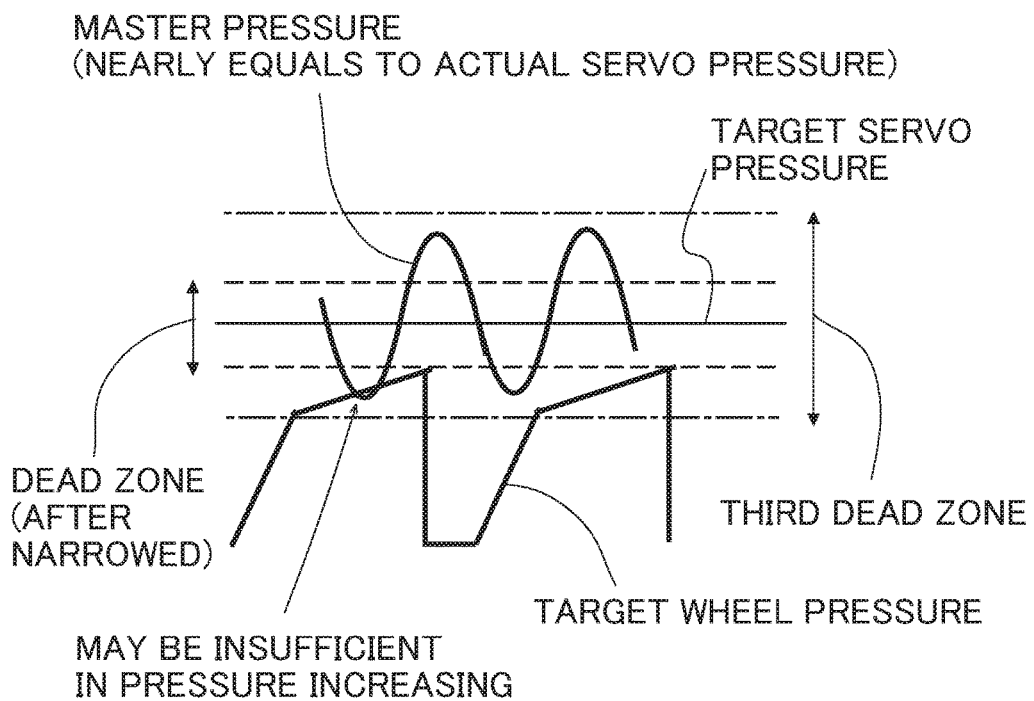
FIG. 7 is a an explanatory diagram which explains the dead zone widening control according to the embodiment; and, FIG. 8 is an explanatory diagram for explaining another example of the PV characteristics.

Further, the dead zone setting portion 63 judges whether or not the road surface situation has changed to the specific road surface state based on the deviation between the target wheel pressure and the target servo pressure in the third dead zone widening control and if the road surface situation is judged to be changed to the specific road surface state, the dead zone setting portion 63 stops the third dead zone widening control and narrows the dead zone width. In other words, according to the embodiment, the smaller the deviation between the master pressure (approximately equal to the servo pressure) and the wheel pressure, the narrower the dead zone becomes. It may be considered that the locking pressure in the ABS control becomes increased to increase the wheel pressure as well when the vehicle is travelling on a specific road surface such as a bad road. Under such situation, if the dead zone is kept widening as shown in FIG. 7, a phenomenon that the master pressure cannot reach to the pressure that satisfies the target wheel pressure level may occur. However, according to the structure of the embodiment, when the road surface condition changes to a specific road surface condition during the third dead zone widening control, the dead zone can be narrowed to suppress the occurrence of the deficient of pressure increase for the wheel. According to the structure of the embodiment, the excess operations of the pressure decreasing valve 41 and the pressure increasing valve 42 can be suppressed and at the same time the ABS performance can be preferentially achieved properly. It is noted that in FIGS. 6 and 7, the vertical direction indicates the pressure and the right/left direction indicates the time.

(Others)

Figure 8:
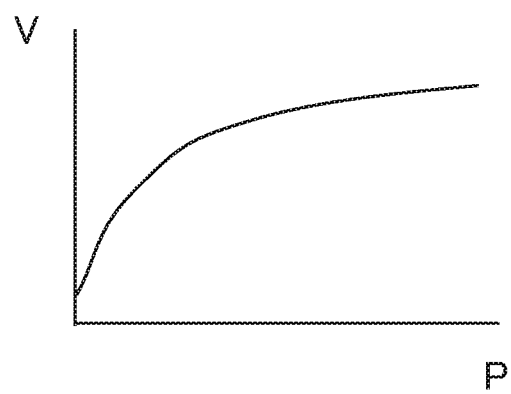

The invention is not limited to the embodiment explained above. For example, the rigidity characteristics (PV characteristics) of the control subject chamber (in this embodiment, the servo chamber 1A, the first pilot chamber 4D or the system containing them) of the control portion 61 which is memorized in the brake ECU 6 may be represented as a curved performance line as shown in FIG. 8. Further, the first pilot chamber 4D may not be provided with the damper mechanism Z. Still further, the vehicle brake device may not be provided with the regulator 44. In such case, for example, a valve device corresponding to the pressure decreasing valve 41 and the pressure increasing valve 42 is directly provided at the servo chamber 1A. In such case, the brake ECU 6 memorizes, for example, the rigidity characteristics of the servo chamber 1A. The structure of the regulator 44 is not limited to the structure having the ball valve 442 and a spool valve may be used instead.

Further, the servo pressure generating device 4 is used as a driving portion for driving the first master piston 14 and the second master piston 15. However, it is not limited to such device and an electrically operated booster device may be used instead as the driving portion. In such case, for example, the control is made by advancing or retreating a ball screw or the like by using a motor and in this case as similar to the embodiment of the present invention an excess operation of a component may be generated due to the pulsation of the master pressure. However, according to the invention, the dead zone is widened depending on the situation to suppress the excess operation of the component. As a result, for example, the abrasion of a brush or the like can be suppressed to improve the durability of the component.

Further, in the third dead zone widening control, a step for judging whether the road surface is specific or not may be added to the flowchart. Further, the subject pressure information in the first dead zone widening control is not limited to the actual servo pressure and any of the target servo pressure or the master pressure may be used as the subject pressure. If the master pressure is used as the subject pressure information, for example, a pressure sensor which detects the master pressure may be provided in the actuator 5, conduit 51 or conduit 52. Further, in the execution judgement in the third dead zone widening control, it can be said that the target servo pressure, the target wheel pressure and the acceleration are the road surface information. The rigidity information is not limited to the information of rigidity itself and any information regarding to the rigidity may be said to be the rigidity information. Similarly, the road surface information is not limited to the information of friction coefficient itself and any information regarding to the friction coefficient may be said as the road surface information.

(Summary)

The vehicle brake device according to the embodiment can be described as follows. In other words, the vehicle brake device according to the embodiment includes a hydraulic pressure generating portion 1, 4 having a driving portion 4 which drives a master piston 14, 15, an actuator 5 disposed between the hydraulic pressure generating portion 1, 4 and a wheel cylinder 541 through 544 for outputting a master pressure which is a hydraulic pressure in a master chamber 1D, 1E to the wheel cylinder 541 through 544 by adjusting the master pressure and a controlling portion 61 which maintains a driving force of the driving portion 4 when a control subject pressure which is a hydraulic pressure in a control subject chamber 1A is within a dead zone set based on a target value of the control subject pressure, wherein the control subject pressure varies in response to a variation of the master pressure and a pulsation is generated in the master pressure accompanying the operation of the actuator 5. The vehicle brake device further includes a rigidity information obtaining portion 62 which obtains a rigidity information which relates to a rigidity of the control subject chamber 1A and a dead zone setting portion 63 which sets the dead zone based on the rigidity information obtained by the rigidity information obtaining portion 62 such that the higher the rigidity of the control subject chamber 1A, or the higher the probability of rigidity increase of the control subject chamber 1A, the wider the dead zone is set by the dead zone setting portion 63.

Further, the rigidity information obtaining portion 62 obtains a subject pressure information which relates to the control subject pressure as the rigidity information, and the dead zone setting portion 63 sets the dead zone based on the subject pressure information such that the higher the control subject pressure, the wider the dead zone is set.

Further, the actuator 5 forms the anti-lock brake system (ABS) and the rigidity information obtaining portion 62 obtains a road surface information which relates to a friction coefficient of the travelling road surface as the rigidity information and the dead zone setting portion 63 sets the dead zone such that the lower the friction coefficient, the wider the dead zone is set.

Further, the dead zone setting portion 63 sets the dead zone such that the larger a deviation between the master pressure and the wheel pressure which is the hydraulic pressure in the wheel cylinder, the wider the dead zone is set. Further, the dead zone setting portion 63 sets the dead zone such that the smaller a deviation of pressure between the master pressure and the wheel pressure which is the hydraulic pressure in the wheel cylinder, the narrower the dead zone is set.

REFERENCE SIGNS LIST

1; master cylinder (hydraulic pressure generating portion), 11; main cylinder, 12; cover cylinder 13; input piston, 14; first master piston, 15; second master piston, 1A; servo chamber, (control subject chamber), 1B; first hydraulic pressure chamber, 10; second hydraulic pressure chamber, 1D; first master chamber, 1E; second master chamber, 10; brake pedal, 171; reservoir, 2; reaction force generating device, 22; first control valve, 23; second control valve, 4; servo pressure generating device (driving portion, hydraulic pressure generating portion), 41; pressure decreasing valve, 42; pressure increasing valve, 431; accumulator, 44; regulator, 445; control piston, 4D; first pilot chamber, 5; actuator, 531; holding valve, 532; pressure decreasing valve, 533; reservoir, 541, 542, 543, 544; wheel cylinder, 5FR, 5FL, 5RR and 5RL; wheel, BF; hydraulic braking force generating device, 6; brake ECU, 61; control portion, 62; rigidity information obtaining portion, 63; dead zone setting portion, 64; friction coefficient presuming portion, 71; stroke sensor, 72; brake stop switch, 73, 74, 75; pressure sensor, 76; wheel speed sensor, 8; acceleration sensor, Z; damper mechanism.

The invention claimed is:

1. A vehicle brake device comprising:
a hydraulic pressure generating portion having a driving portion which drives a master piston;

an actuator disposed between the hydraulic pressure generating portion and a wheel cylinder for outputting a master pressure which is a hydraulic pressure in a master chamber to the wheel cylinder by adjusting the master pressure; and a controlling portion which maintains a driving force of the driving portion when a control subject pressure which is a hydraulic pressure in a control subject chamber is within a dead zone set based on a target value of the control subject pressure, wherein the control subject pressure varies in response to a variation of the master pressure and a pulsation is generated in the master pressure accompanying an operation of the actuator, the vehicle brake device further including:

a rigidity information obtaining portion which obtains a rigidity information which relates to a rigidity of the control subject chamber, the rigidity of the control subject chamber being the pressure change of the control subject chamber required to change the unit volume of the control subject chamber; and a dead zone setting portion which sets the dead zone based on the rigidity information obtained by the rigidity information obtaining portion such that the higher the rigidity of the control subject chamber, or the higher the probability of rigidity increase of the control subject chamber, the wider the dead zone is set, wherein the rigidity of the control subject chamber is higher as the control subject pressure is higher, the actuator forms an anti-lock brake system and the rigidity information obtaining portion obtains a road surface information which 1) relates to a friction coefficient on a travelling road surface as the rigidity information and 2) is used to determine the probability of rigidity increase of the control subject chamber, and the dead zone setting portion sets the dead zone based on the road surface information such that the lower the friction coefficient, the wider the dead zone is set.

2. The vehicle brake device according to claim 1, wherein the rigidity information obtaining portion obtains a subject pressure information which relates to the control subject pressure as the rigidity information, and the dead zone setting portion sets the dead zone based on the subject pressure information such that the higher the control subject pressure, the wider the dead zone is set.

3. The vehicle brake device according to claim 2, wherein the dead zone setting portion sets the dead zone such that the smaller a deviation between the master pressure and the wheel pressure which is a hydraulic pressure in the wheel cylinder, the narrower the dead zone is set.

4. The vehicle brake device according to claim 1, wherein the dead zone setting portion sets the dead zone such that the larger a deviation between the master pressure and the wheel pressure which is a hydraulic pressure in the wheel cylinder, the wider the dead zone is set.

5. The vehicle brake device according to claim 1, wherein the dead zone setting portion sets the dead zone such that the smaller a deviation between the master pressure and the wheel pressure which is a hydraulic pressure in the wheel cylinder, the narrower the dead zone is set.

6. The vehicle brake device according to claim 2, wherein the dead zone setting portion sets the dead zone such that the larger a deviation between the master pressure and the wheel pressure which is a hydraulic pressure in the wheel cylinder, the wider the dead zone is set.

* * * * *